(12) United States Patent
Knight et al.

(10) Patent No.: US 6,976,834 B2
(45) Date of Patent: Dec. 20, 2005

(54) PELLETIZING DIE WITH EVEN HEAT DISTRIBUTION AND WITH POLYMER CHANNEL TO ORIFICE TRANSITION ZONE, PROCESS FOR ORIFICE THERMAL STABILIZATION AND PROCESS FOR FORMING A PELLETIZING DIE WITH BRAZING AND THIN HARD FACE LAYER

(75) Inventors: Clifton T. Knight, Houston, TX (US); Judeth Brannon Corry, Manvel, TX (US); Jürgen Blum, Velten (DE); Andreas Grundmann, Berlin (DE); Dieter Bormann, Berlin (DE); Andreas Forster, Berlin (DE)

(73) Assignee: Borsig GmbH, Berlin (DE)

( * ) Notice: Subject to any disclaimer, the term of this patent is extended or adjusted under 35 U.S.C. 154(b) by 215 days.

(21) Appl. No.: 09/901,873

(22) Filed: Jul. 9, 2001

(65) Prior Publication Data

US 2003/0008026 A1    Jan. 9, 2003

(51) Int. Cl.[7] .............................................. B29B 9/06
(52) U.S. Cl. ............... 425/311; 425/382 R; 425/379.1; 425/464
(58) Field of Search .................... 425/310, 311, 382 R, 425/378.1, 379.1, 464, 313, DIG. 110, DIG. 245, 425/DIG. 246

(56) References Cited

U.S. PATENT DOCUMENTS

| | | | |
|---|---|---|---|
| 3,461,495 A | * | 8/1969 | Swickard et al. ........ 425/192 R |
| 3,847,530 A | * | 11/1974 | Hamilton .................... 425/461 |
| 4,167,386 A | * | 9/1979 | Mallay ........................ 425/463 |
| 4,378,964 A | | 4/1983 | Wolfe, Jr. .................... 425/463 |
| 4,516,925 A | | 5/1985 | Fujita et al. ................. 425/463 |
| 4,678,423 A | | 7/1987 | Bertolotti .................... 425/311 |
| 4,752,196 A | | 6/1988 | Wolfe, Jr. ...................... 425/67 |
| 4,822,546 A | | 4/1989 | Lohkamp .................... 264/143 |
| 4,856,974 A | | 8/1989 | Wolfe, Jr. ...................... 425/67 |
| 5,989,009 A | | 11/1999 | Matsuo ........................ 425/464 |
| 6,638,045 B2 | * | 10/2003 | Yoshii et al. .................. 425/67 |

FOREIGN PATENT DOCUMENTS

| | | |
|---|---|---|
| DE | 32 43 332 | 1/1984 |
| EP | 0 862 944 | 9/1998 |

OTHER PUBLICATIONS

Pierson, "Handbook of Refractory Carbides and Nitrates", 1996.*

* cited by examiner

Primary Examiner—Joseph S. Del Sole
(74) Attorney, Agent, or Firm—McGlew and Tuttle, P.C.

(57) ABSTRACT

A pelletizing die includes a pelletizing die member with a die exit side exposed to cooling fluid and a die entry side for receiving polymer fed thereto. The die member has a plurality of polymer channels and a plurality of extrusion orifices connected to a respective one of the channels to form a extrusion orifice section. A heating medium system has additional heating medium conduits between channels and a supply and intermediate header for heating the channels (radially from each side) and providing once in and once out heating medium flow. The die member may be formed by high temperature brazing of components using coordinated solder (Ni based or gold-nickel) and component heat treatment temperature. A thin hard face coating may be provided on raised extrusion orifice ring faces around each extrusion orifice section.

17 Claims, 7 Drawing Sheets

SECTION A-A

PELLETIZING DIE WITH EVEN HEAT DISTRIBUTION AND WITH POLYMER CHANNEL TO ORIFICE TRANSITION ZONE, PROCESS FOR ORIFICE THERMAL STABILIZATION AND PROCESS FOR FORMING A PELLETIZING DIE WITH BRAZING AND THIN HARD FACE LAYER

FIELD OF THE INVENTION

The invention relates generally to pelletizing dies and more particularly to pelletizing dies with a pelletizing die member with a die exit side expose to a cooling fluid and a die entry side for receiving polymer fed thereto.

BACKGROUND OF THE INVENTION

Pelletizing dies are utilized by polymer manufacturers for the purpose of converting their product into pellet form for bulk shipment to fabricators of plastic components. These fabricators require that the pellets meet minimum shape and size specifications. The ideal pellet will have a good length to diameter aspect ratio with a smooth skin and no tails or strings of polymer stretching from the pellet. The ideal pellet will maintain this characteristic shape during all operations.

As the demand for polymers increases, larger production lines are desired by the manufactures to economize production of the pellets. As the pelletizing dies become larger, the percentage of pellets produced that meet the required quality standard is reduced.

Compounding the problem is the fact that fabricators of plastic components are tightening the specifications as to the definition of a good pellet. The pellets that do not meet fabricators specifications must be re-melted or sold off at greatly reduced prices.

Pellets of poor quality result for a variety of reasons, poor heat distribution, poor heat control, improper cooling effects, incorrect geometries in the polymer channels and orifices, and improper cutting conditions to name a few.

Several companies worldwide manufacture pelletizing dies. They have achieved some improvement in quality with empirical or trial and error methods. However, such manufacturers have been unable to resolve the pellet quality problem to the satisfaction of the polymer manufacturers.

SUMMARY AND OBJECTS OF THE INVENTION

The primary object of the present invention is to improve pellet quality with good production volume.

According to the invention, a pelletizing die is provided including a die member with a die exit side exposed to cooling fluid and a die entry side for receiving polymer fed thereto. The pelletizing die member includes a plurality of polymer channels. A plurality of extrusion orifices are connected to each of the respective polymer channels such that the group of extrusion orifices form a extrusion orifice section. A heating medium system is provided including heating medium conduits with at least one conduit adjacent to each polymer channel for heating the polymer channel. A thermal stabilization cavity is provided adjacent to each extrusion orifice of a extrusion orifice section. The thermal stabilization cavity defines a thermal stabilization zone between the die exit side exposed to the cooling fluid and the heating medium conduits. The arrangement allows the polymer to remain in a liquid state up to a solidification point which is just as the polymer exits the extrusion orifice.

The thermal stabilization cavity may be provided as one or more cavity parts. This may include a space surrounding each extrusion orifice section with the surrounding thermal stabilization cavity being formed just inwardly of the die exit side. The thermal stabilization cavity may include a space extending between each extrusion orifice section. This may be provided at a location just inwardly of the die exit side. The thermal stabilization cavity may also be a space extending substantially circumferentially between each extrusion orifice and/or with a space extending substantially radially between each extrusion orifice within each section. These spaces or cavities may be filled with air or another gas that provides good insulation properties. The spaces may also be filled with an insulation material. The thermal stabilization cavity or thermal stabilization zone may also be a combination of several spaces as noted above.

These thermal stabilization cavities serve as heat transfer dampeners whereas thermal stabilization takes place due to conduction, convective, and radiation heat transfer in the open cavities. These areas are located below the hard face and around the circumference of a cluster of die orifices. The heat transfer design employed enables uniform heat transfer to occur both radially, circumferentially, and through the thickness (longitudinally) of the die. The thermal stabilizer cavities ensure that the temperature (cooling or heating) of the polymer is nearly uniform at the exit of the orifice hole. The thermal stabilizer cavities provide unsteady-state heat transfer buffers for the pelletizing die. The thermal stabilizer cavities provide an additional heat transfer control between the polymer, the fluid system and the cooling fluid bath.

Radially surrounding (radial) thermal stabilizer cavities support the damping of any unsteady-state temperature fluctuations between the "neighbor" orifices within one orifice cluster.

Circumferential thermal stabilizer cavities ensure support to dampen any unsteady-state temperature fluctuations between the orifice clusters. Each of the orifices see the same temperature due to equal process condition.

Longitudinal thermal stabilizer cavities may be used to stabilize the heat transfer between the cooling fluid side (cool side) and the polymer side (hot side). Another aspect of such thermal stabilization is the improvement of the thermal shock resistance during start up with benefits being the avoiding of cracks in the hard face layer due to the high thermal loads. The longitudinal thermal stabilizer protects the heat transfer media inlet cross over (hot fluid) from the cold cooling fluid of the cooling fluid bath. The longitudinal thermal stabilizer enables uniform heat transfer and eliminates harmful three-dimensional heat transfer effects.

According to another aspect of the invention a pelletizing die is provided with a die member with a plurality of polymer channels, a plurality of extrusion orifices in groups connected to a respective one of the polymer channels to form extrusion orifice sections and with a heating medium conduit system. The extrusion orifices and associated polymer channel form a plurality of extrusion orifice transition zones to prevent melt-fracture. The specific polymer characteristics are taken into account by use of appropriate geometries, pressures and flow rates so as to maximize production and eliminate melt-fracture, and to assure the proper thermal transition of the polymer for maximum pellet quality.

Melt fracture is damage in the polymer structure, which can occur due to high shear rates caused by high production rates and the design of the geometry of the polymer entries. The die of present invention employs a smooth transition design for the entry in the transition/extrusion orifice area, in order to support the prevention of the melt fracture.

The invention based on the use of computational fluid dynamics (CFD) tools to calculate and to predict rheometer performance. Because of this, the CFD simulations can be extended to estimate the performance of the pelletizing die. Utilizing this technique, CFD simulations and lab tests show, that when other pelletizing dies are operating at the onset of melt fracture the die of present invention is operating below the onset of melt fracture for the same process conditions. Other dies have flat or irregular surfaces on the bottom of the orifice area (inlet to the transition/orifice) on the inlet to the transition zone /extrusion orifice area, which increase the possibility of melt fracture.

Melt fracture can be avoided when the following design improvements and process requirements are calculated. The relation between numbers of extrusion orifices, length of the extrusion orifices, lengths of the transition zone, and diameter of the extrusion orifice holes are important for avoiding meltfracture under the consideration of the production flow, temperature and the rheology of the polymer. Any flat or irregular surfaces on the bottom of the orifice area (inlet to the transition/orifice) on the polymer side have to be avoided, in order to prevent melt-fracture. Only the polymer channels of the die of present invention were formed with a radius and uneven bottom in the orifice area.

According to still another aspect of the invention a pelletizing die is provided with a pelletizing die member having the channels and extrusion orifices forming extrusion orifice sections with the joining between polymer channels and extrusion orifices forming a plurality of orifice transition zones. A heating medium system is provided with heating medium conduits adjacent to each channel and also including a transition zone conduit between adjacent channels and adjacent to transition zones for heating polymer in the respective extrusion orifices.

The heating medium system preferably includes a supply heating medium conduit radially outward of the extrusion orifice section as well as additional heating medium conduits between adjacent channels for heating the polymer channels and an intermediate heating medium conduit connected to the transition zone conduits and connected to the additional heating medium conduits for transferring heating medium between the transition zone conduits and the additional heating medium conduits. This provides a once-in and once-out heating medium flow for even heat distribution.

Since heat must be transferred between the heat transfer media and the polymer inside each pellet hole at the same rate in order to achieve consistent pellet shape, it is therefore necessary that the heat transfer media flow rate through each inlet crossover channel be the same. It is also necessary that the temperature of the heat transfer media passing through the crossover channels be nearly the same. In this way, the heat transfer from the heat transfer media channels to the polymer inside the pellet extrusion orifices will be the same for all 105 pellet extrusion orifice locations.

According to still another aspect of the invention a pelletizing die is provided with a die member having a plurality of polymer channels, a plurality of extrusion orifices connected to a respective one of said polymer channels to form a extrusion orifice section as well as heating medium conduits forming a heating medium system. The die member also includes a raised extrusion orifice ring and a hard face (layer) coated onto the exit side surface of the extrusion orifice ring. The hard face has a thickness of less than one millimeter and has a high hardness level greater than 800 HVO1.

The extrusion orifices in the extrusion orifice ring with the hard face coating have to be drilled before the hard face coat is applied. Due to the above mentioned manufacturing steps an excellent shape on the exit of the orifice holes is achieved.

Other dies use a thicker hard face between 3 and 4 mm or thin hard face plates, which do not work (peeling off) due to the high thermal loads, as they are not dampened with thermal stabilization cavities.

The invention also relates to a method of forming a die member and a method of using a die member. The method of formation preferably includes brazing components to form the die member and the formation of a hard face coat. The thermal stabilization cavities are advantageously manufactured by using the high temperature brazing process. The brazed joint is between the extrusion orifice ring and the die exit side. In addition, this brazing technology allows the connecting of different sizes, especially small dimensions, and material with minimal distortion of the material.

The brazing process takes place in a temperature ranging between 900° C. and 1200° C. and under vacuum in a furnace. The furnace is flushed with argon gas during cooling for avoiding oxidation as well as for the acceleration of the cooling time itself. One other important benefit of using the high temperature brazing process under a vacuum is also the creation of a vacuum in the thermal stabilization cavities.

A special heat treatment process is worked out, in order to maintain and to optimize the material properties of the die. After the extrusion orifice ring is attached onto the surface of the disc, the following heat treatment steps are carried out: heating, holding (at solution heat treatment temperature), intermediate heat treatment, tempering and cooling.

The method of use includes operating a die as disclosed above, particularly with even heat distribution as noted above and with a polymer channel to orifice transition zone using features as mentioned above.

The invention is based on a use of current technology to analyze the polymer and how it is affected by pellet die geometries and heat transfer conditions and to provide a pellet die based on these findings, as well as a system, method of use and method of forming the dies. Using these methods, various structural and process features have been developed as discussed above and further discussed below.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Referring to the drawings in particular, the invention comprises a pelletizing die generally designated 10 as well as a process for forming a thermal stabilization interface and a method of using a pelletizing die 10 as well as a method of forming a pelletizing die 10. The pelletizing die 10 has an exit side 14 with a plurality of extrusion orifice sections 12. The pelletizing die 10 has a die entry side 16 with a plurality of polymer channel intakes 18 that connect to polymer channels 38. The pelletizing die 10 also has an inlet heating fluid header (inlet heat transfer media header) 20 and a discharge heating fluid header (discharge heat transfer media header) 22. The inlet heat transfer media header 20 is fed by heat transfer media supply line 26 and the discharge heat transfer media header 22 is fed by heat transfer media discharge line 28. On the die exit side 14 each of the extrusion orifice sections 12 are located within a hard face coating 32 on the raised surface of extrusion orifice ring 36 that is brazed onto the pelletizing die 10. The hard face 32 is particularly for interaction with a pelletizing knife (not shown). The extrusion orifice sections 12 each include a plurality of extrusion orifices 30.

Figure 1:
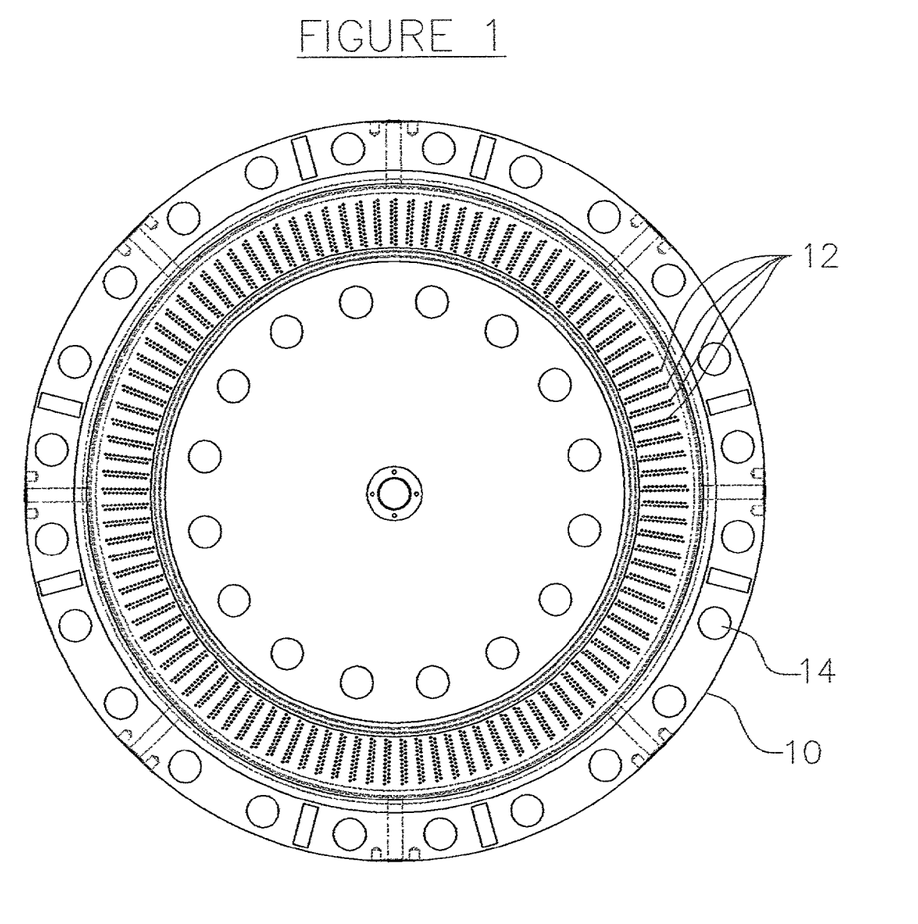
FIG. 1 is a front view showing the exit side of a pelletizing die according to the invention.
Figure 2:
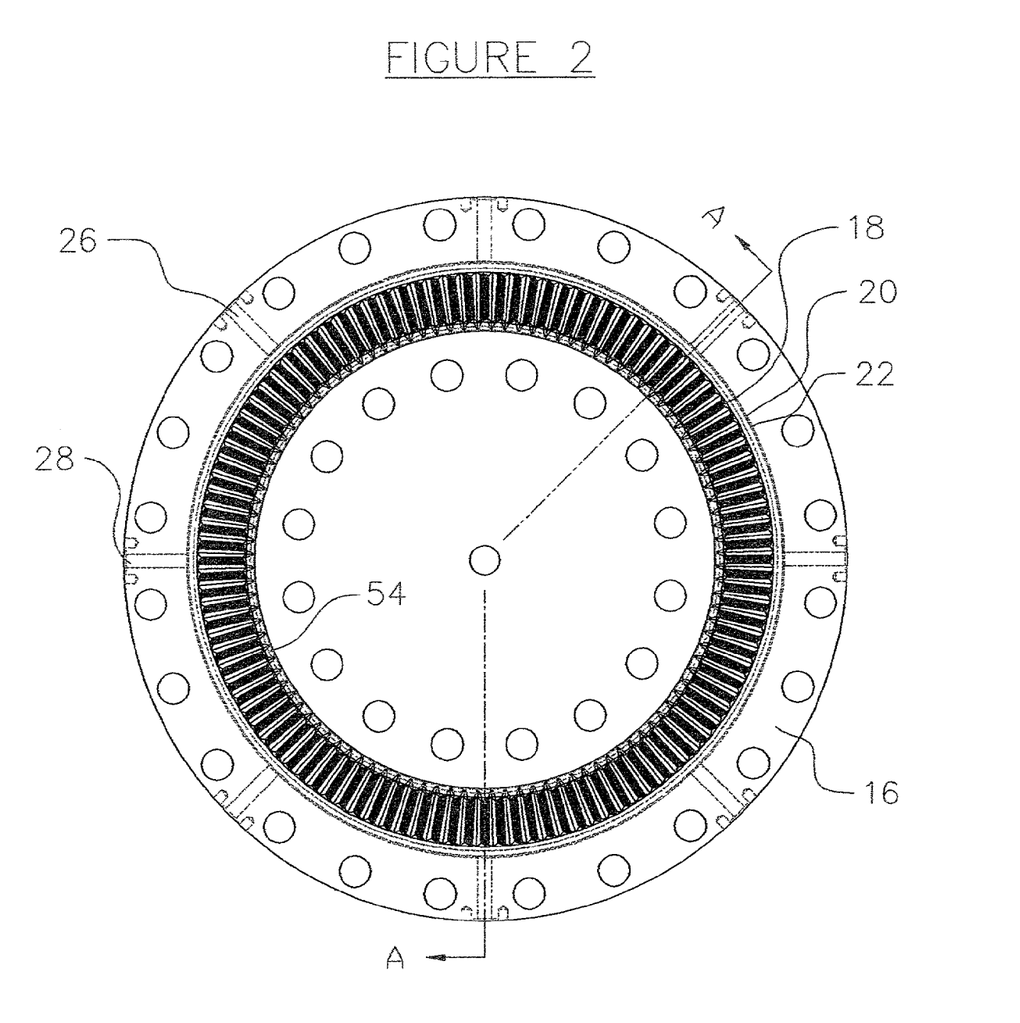
FIG. 2 is a rear view showing the die entry side of the pelletizing die of FIG. 1.
Figure 3:
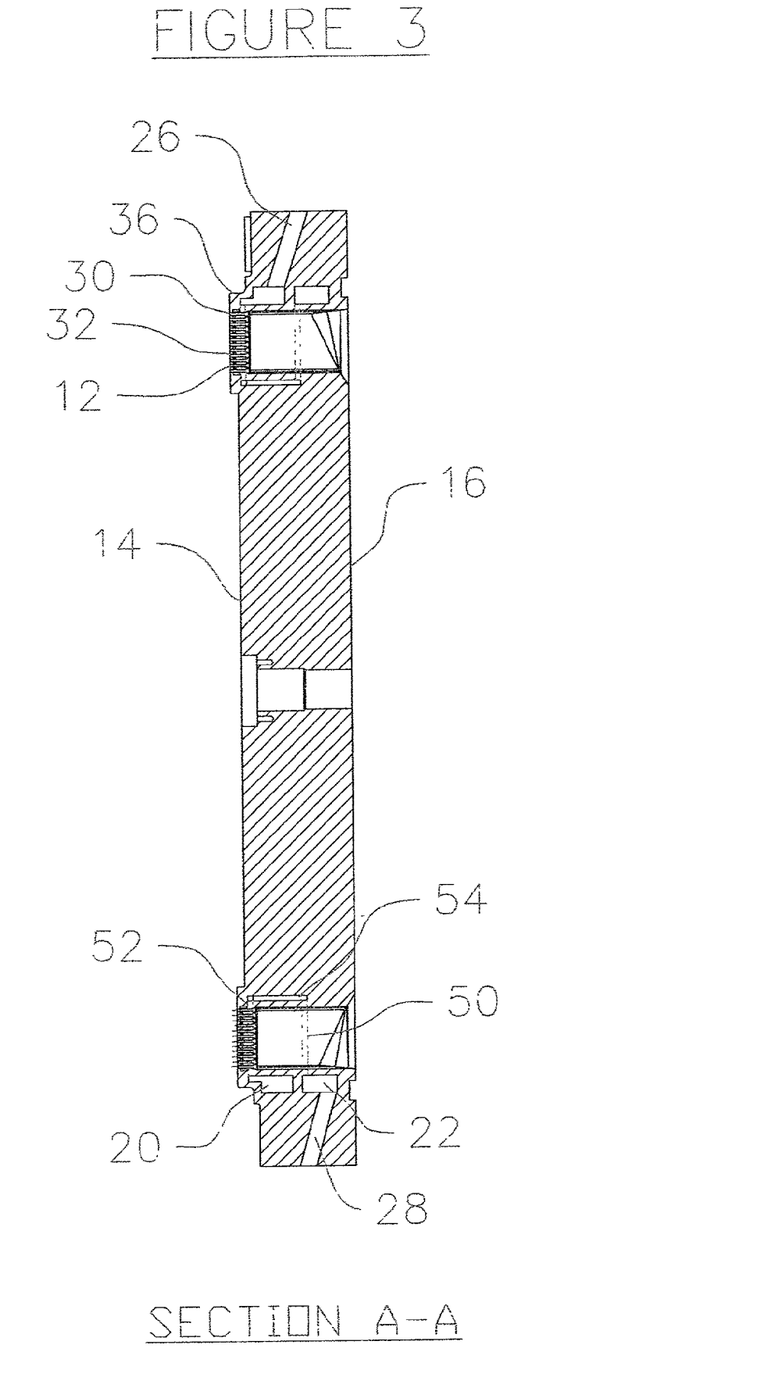
FIG. 3 is a cross sectional view taken along line A—A of FIG. 2.
Figure 4:
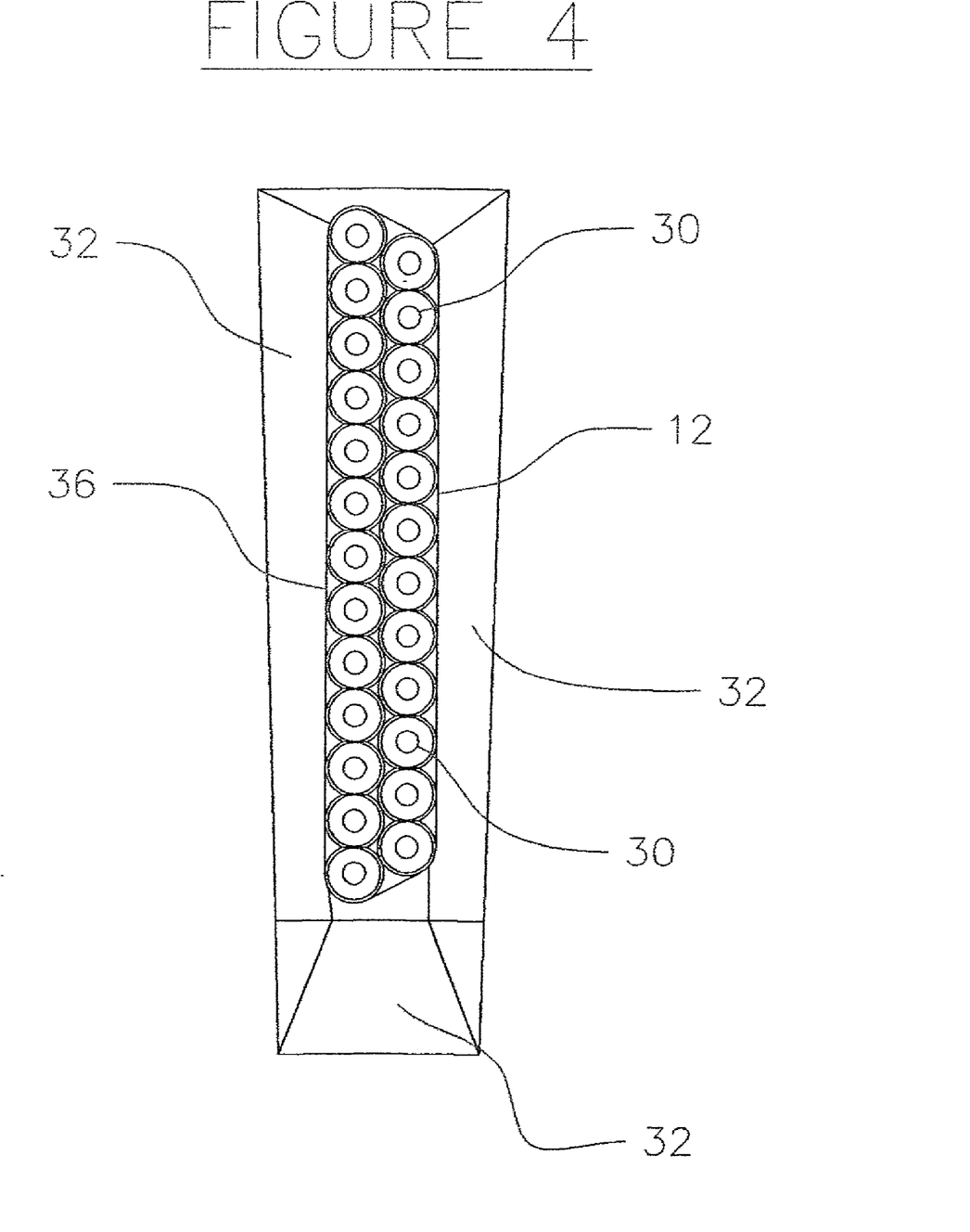
FIG. 4 is an enlarged rear view of an extrusion orifice section with multiple extrusion orifices.

FIG. 4 shows a preferred extrusion orifice section 12 within extrusion orifice ring 36, enlarged as compared to the showing of FIGS. 1 through 3. The extrusion orifice ring 36 is shown in FIG. 4 with the hard face 32 coated on the extrusion orifice ring 36 and with this extrusion orifice ring 36 encompassing the extrusion orifice section 12. The formation of the pelletizing die 10 with hard face 32 on the extrusion orifice ring 36 is described further below.

The method of formation includes brazing extrusion orifice ring 36 with hard facing 32 to the exit side 14 surface of pelletizing die 10. Brazing is performed in an oven under a vacuum to prevent oxidation of components at elevated oven temperatures. Following vacuum brazing, the oven is flushed with an argon gas atmosphere to speed up cooling while providing a protective atmosphere for the components. Brazing solders with an application temperature of between 900° C. and 1,200° C. are utilized to correspond with the temperature at which components of the pelletizing die 10, and the extrusion orifice ring 36 will be subsequently heat treated. The brazing process is advantageous in the formation of the thermal stabilization cavities 40, 42 and 44 in that it allows the connection of different size components, especially those of different material and delicate structure to be joined with minimal distortion and with high positioning accuracy. A further advantage of the vacuum brazing process is a resulting vacuum in the thermal stabilization cavities 40, 42 and 44, which is more resistant to heat transfer than would be air for example. A heat treatment process follows the brazing process, consisting of heating and holding the brazed assembly of the pelletizing die 10 and the extrusion orifice ring 36 at a solution heat treatment temperature for a period of time, intermediate heat treatment, tempering and cooling. This heat treatment process is utilized to maintain and optimize the material properties of the pelletizing die 10 and the extrusion orifice ring 36.

Figure 5:
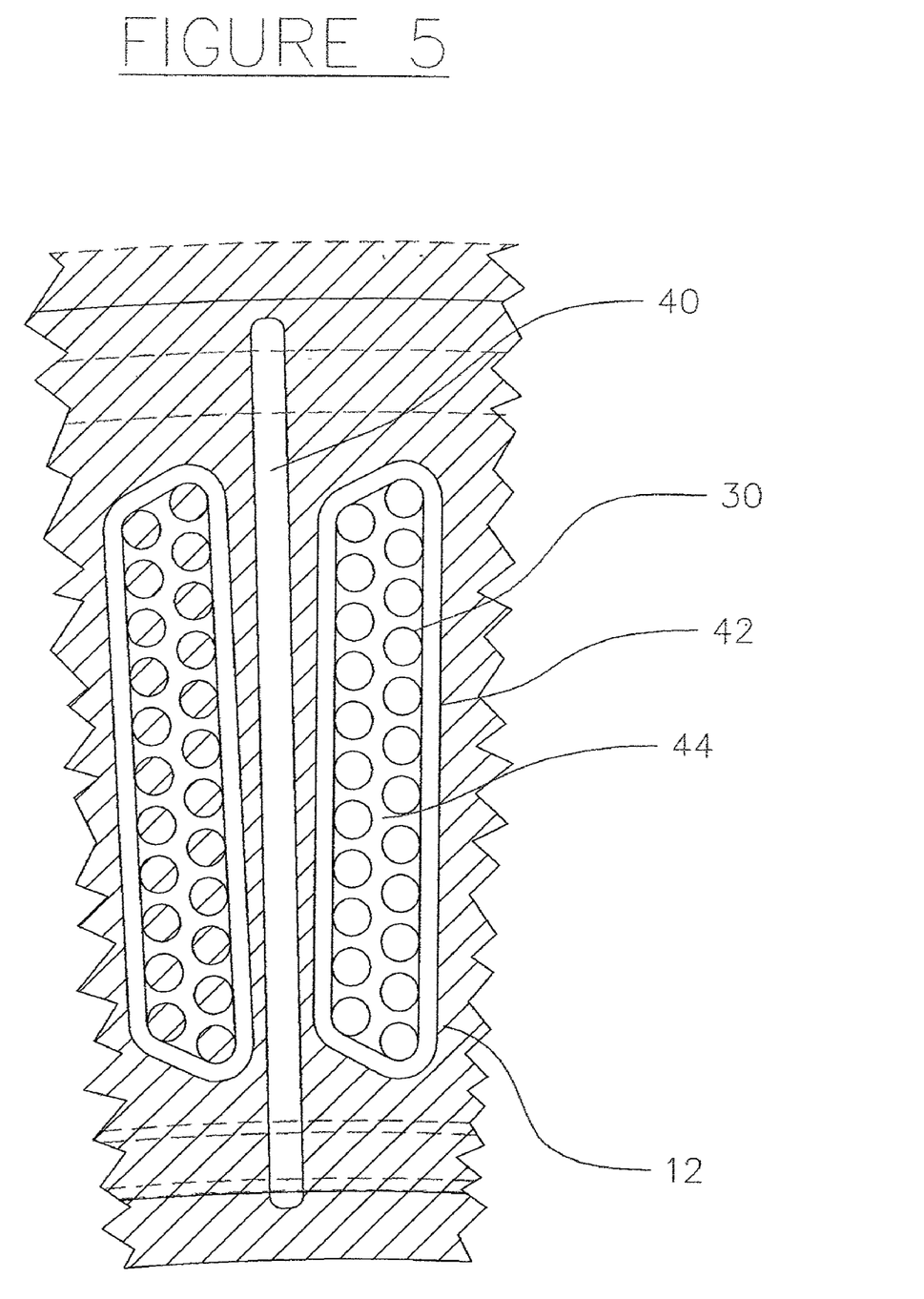
FIG. 5 is a broken away cross sectional view showing two extrusion orifice sections, each with multiple extrusion orifices, showing cavities (i.e. space, e.g. air gap) for a thermal stabilization cavity surrounding the extrusion orifices.
Figure 6:
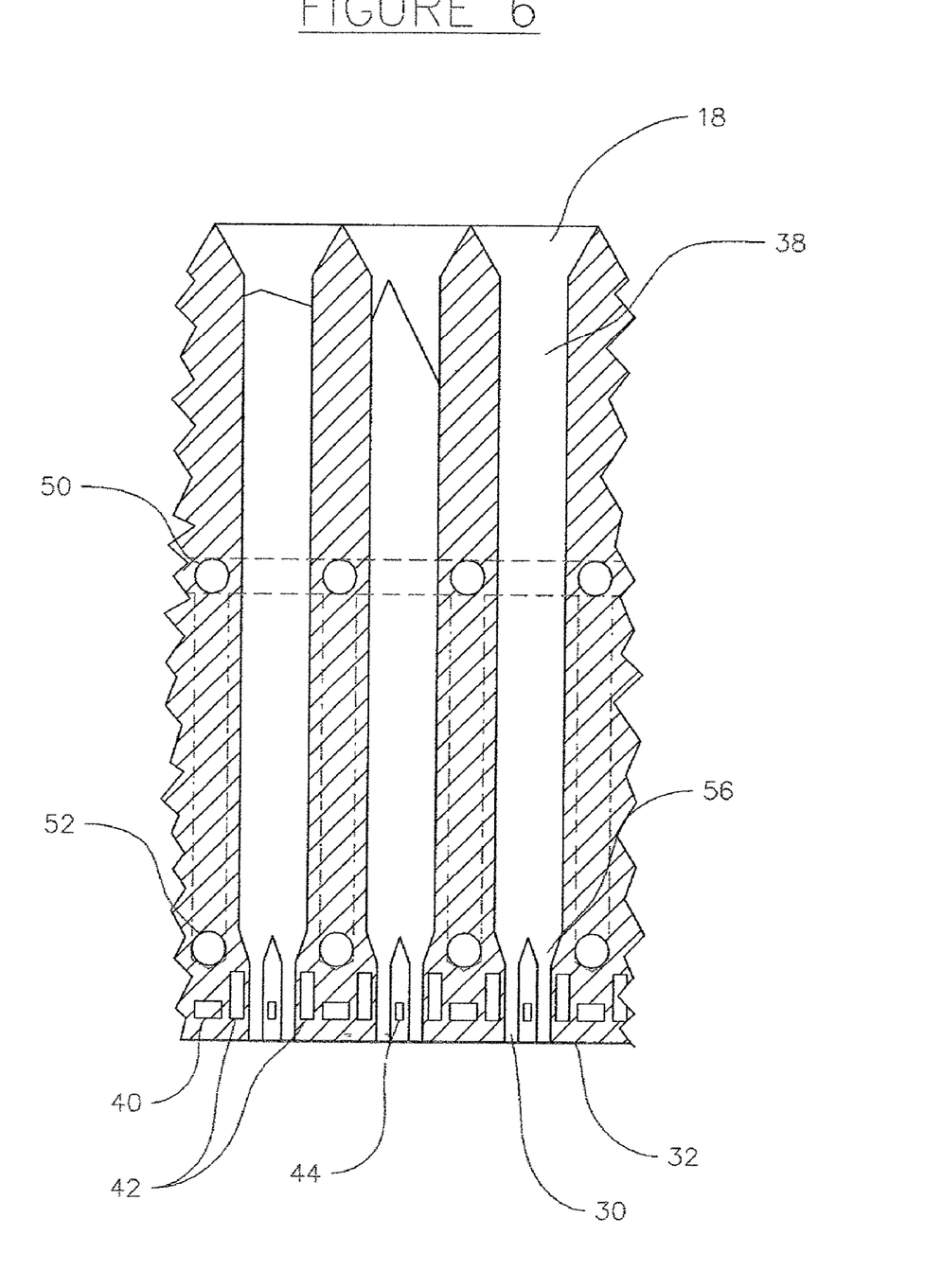
FIG. 6 is a broken away cross sectional view showing three extrusion orifice sections at a right angle to the view of FIG. 5 and showing heat transfer media crossover channels for distributed even heat.

FIG. 5 shows a cross sectional view along a plane passing through the thermal stabilization cavities 40, 42 and 44. These cavities 40, 42 and 44 form a thermal stabilization zone, provided to thermally stabilize the extrusion orifices 30. FIG. 5 shows two adjacent extrusion orifice sections 12. The arrangement continues for the other extrusion orifice sections 12 as shown for example of FIG. 1. Longitudinal thermal stabilization cavities 40 provide thermal stabilization between the extrusion orifice ring 36 exposed to the cooling fluid, and the pelletizing die 10 exposed to the hot heating fluid and hot semi-liquid polymer. Circumferential thermal stabilization cavity 42 forms a ring around orifice section 12 to provide thermal stabilization between two adjacent extrusion orifice sections 12. Further, radial thermal stabilization cavity 44 extends between the two rows of extrusion orifices 30 that form the orifice section 12 to provide thermal stabilization between neighboring extrusion orifices 30 in each extrusion orifice section 12. FIG. 6 also shows these thermal stabilization cavities 40, 42 and 44.

Construction of the thermal stabilization cavities is facilitated through the formation of the cavity recesses on the surface of the die 10 exit side 14 that are subsequently covered with the brazed on extrusion orifice ring 36 possessing a hard facing 32 creating a raised surface of extrusion orifice sections.

FIG. 6 shows the heating fluid network (including heating medium conduit) which includes heat transfer media exit side crossover channels 50 and heat transfer media entry side crossover channels 52. By providing heating in the regions as shown, particularly near the extrusion orifices 30 and near the transition zone 56 of the extrusion orifices 30 (e.g. at the region at the end of the polymer feed channels 38 and at the beginning of the extrusion orifices 30, i.e., the transition zone conduit) and along the feed channels 38 via crossover channels 50 and 52, equal heat distribution is provided to the polymer, to each extrusion orifices 30 and to the polymer in each orifice section feed channel 38.

Figure 7:
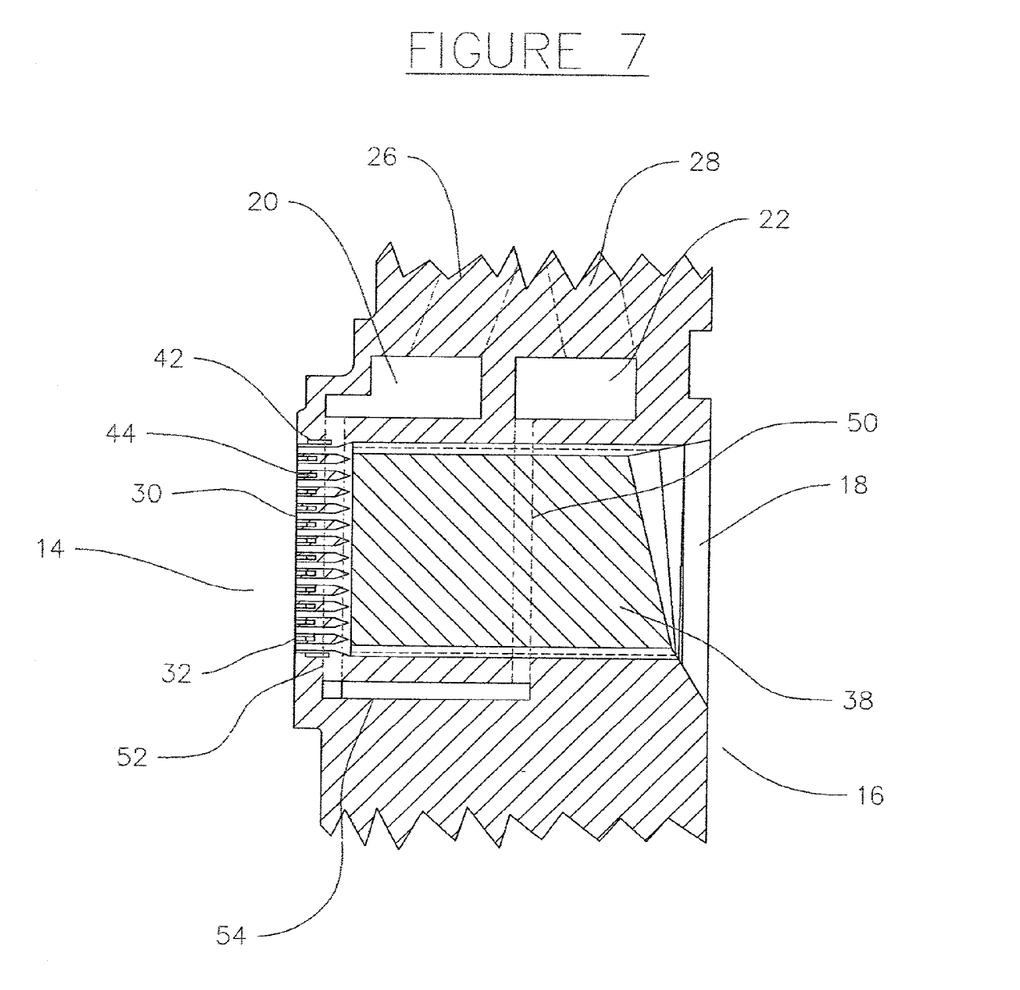
FIG. 7 is a broken away cross sectional view taken substantially at right angles to the view of FIG. 5 and the view of FIG. 6 showing in the raised hard facing surface as well as heat transfer media (i.e. heating fluid) distribution system.

FIG. 7 shows the inlet header 20 with heat transfer media supply line 26 and the discharge header 22 with heat transfer media discharge line 28. The inlet header 20 is connected to the heat transfer media supply lines 26 and to the heat transfer media entry side crossover channels 52. Heat transfer media passes through crossover channels 52 to heat transfer media exit side crossover channels 50 via intermediate header 54. Heat transfer media exit side crossover channel 50 is connected to discharge header 22 for discharge via discharge heat transfer media line 28. This provides a once in once out heating medium flow through the above described undivided circumferential header inclusive of the inlet header 20, heat transfer media supply lines 26, heat transfer media entry side crossover channels 52, intermediate header 54, heat transfer media exit side crossover channels 50, and discharge header 22.

The die of present invention employees a single pass heating and cooling systems. The fluid enters the face of the die and flows across and back through the stiffeners. Other dies have a heat transfer configuration that only heats the die with multiple passes and cause non-uniform heat distribution. The operating process requires a uniform heat removal from the polymer in the extrusion orifice area in a highly controlled manner. On the other hand, the polymer has to be heated in the extrusion orifice area during start up. The fundamental design of the fluid header and entry/exit cross over along with the impact of both the fluid system and the thermal stabilizer are crucial to the die of present invention.

The size of the inlet fluid header, the discharge fluid header and the connection holes between entry cross over and exit cross over is the key to providing the same heat transfer rate to each extrusion orifice. The required amount of heat transfer is achieved due to the fact that a large amount of the fluid entry side is located in the stiffening system. The same overall heat transfer is provided through equal pressure drop and uniform flow through on each entry cross over.

In operation polymer is fed to channel intakes 18 in the die 10 from a transition piece (not shown) that mates up to the die and the polymer pump (not shown). These channel intakes 18 are aligned in a circular pattern around the outer portion of the die as shown in FIG. 2. The channel intakes 18 feed into polymer channels 38. At the end of the channels 38 a series of extrusion orifices (holes) 30 are provided for extruding polymer into spaghetti like strings see FIG. 3. Groups of the extrusion orifices 30 are connected to each channel 38 to form each extrusion orifice section 12. Each extrusion orifice 30 is connected to a respective associated channel 38 via a transition zone 56. The polymer strings are cut into pellets by a set of rotating blades (not shown) as they exit the extrusion orifices 30.

The heating fluid network feeds heating medium via inlet header 20 and outlet header 22 around the outer diameter or exterior side of the polymer channels 38. The intermediate header or transfer header 54 passes heating medium around the inner diameter or interior side of the polymer channels see FIGS. 2 and 7.

The surface at which the polymer exits the extrusion orifices, namely the extrusion orifice ring 36 is hardened for improved wear characteristics and even consistent cutting of the polymer into pellets based on the application of a hard facing 32. According to another aspect of the invention, the extrusion orifice ring 36 is provided with a hard face layer 32 which is very thin, particularly thinner than 1 mm.

The provided surface or hard face 32, at which the polymer's discharge end at which pellets are cut off by knifes, is resistant to thermal shock, resistant to abrasion, resistant to corrosion as well as resistant to cavitation. The hard face layer 32 is provided so as to avoid flaking and is provided on extrusion orifice ring 36 such that the extrusion orifices 30 for the polymer streams have sharp adjacent edges forming the hard face 32 (see FIG. 4). Creation of sharp edges around the extrusion orifices 30 is facilitated by drilling through extrusion orifice ring 36 prior to application of hard face layer 32 and subsequent brazing of extrusion orifice ring 36 with extrusion orifices 30 and hard face coating 32 to exit side 14 of pelletizing die 10.

The exit face of the die (side 14) is immersed in cooling fluid during operation. The cut pellets are carried away by the cooling fluid being pumped from that area. This cooling fluid also provides the cooling required to solidify the polymer, as it exits the die 10.

The die 10 uses several technology developments that improve the evenness of the heat in the die where needed, reduce heat when it is not needed, and employ improved geometric channels that eliminate melt fracture. The hard face technology is used for the cutting face or hard face 32 of the die 10 for better and more consistent cutting of the polymer into pellets.

In the region around the extrusion orifices 30 just behind the hard face cutting surface 32 the thermal stabilization zone is provided with the thermal stabilization cavities 40, 42 and 44 between the heat transfer media heating system 50, 52, 20, 22 and 54 and the cooling fluid on the face of the die 10. This zone is achieved by disposing the thermal stabilization cavities 40 and 42 surrounding the extrusion orifices (including e.g., surrounding respective extrusion orifice sections 12), which are actually cavities in this section of the die (FIGS. 5 and 6) and disposing additional thermal stabilization cavities 44 just behind the extrusion orifice ring 36 but between each section of 23 extrusion orifices. These spaces 40, 42 and 44 may be filled with a different gas (besides air) or a different insulation material with greater thermal stabilization properties than air may be employed.

The 105 channels 38 route polymer to the extrusion orifice holes 30. The extrusion orifice holes 30 are approximately 0.125 inches in diameter. 23 extrusion orifice holes are provided in one extrusion orifice section 12 at the end of each channel 38. These channels 38 are approximately 3.2 inches in length, 0.525 inches wide and are aligned in a circular pattern around the disk. There is a funnel shaped transition zone 56 from the channels 38 to the extrusion orifices 30 (see FIGS. 1, 2, 3, and 6).

The die 10 has a total of 2,415 extrusion orifices 30 that extrude polymer in streams of approximately 0.125 inches in diameter. The die 10 has the extrusion orifice ring 36 raised from the face of the die where the extrusion orifices 30 terminate. This extrusion orifice ring 36 is raised for the purpose of having a set of rotating knives slide across the exit of each extrusion orifice 30, slicing the polymer streams into pellets with a length approximately equal to their diameter.

The complex system of headers 20, 22 and 54 and cross over tubes 50 and 52 carry hot heat transfer media evenly to all sections of the die and maintain the polymer in a semi-liquid state. The inlet header 20 completely encircles the outer circumference of the die 10, outside the circle of polymer channels and extrusion holes. This inlet header 20 is not sectioned off at any point and has four equally spaced supply line connections 26. The cross sectional shape of this inlet header 20 is a "Square" with a smaller square section 21 extending off the top edge and encircles the die see FIG. 7. The supply lines 26 are connected to the main square header 20 on the opposite side from the smaller square section 21 and at the top of the header 20. The cross over channels 50, 52 of the heat transfer media system are connected to this small square section 21 at 26 the top of the header 20 to inlet cross over channel 52. These heat transfer media entry side cross over channels 52 are located between each section 12 of 23 extrusion orifices 30 at the end of each polymer channel 38 approximately 0.525 inches from the exit end of the extrusion orifices 30 and from hard extrusion orifice hard face 32.

The heat transfer media entry side cross over channels 52 feed to the inner or intermediate header 54 that encircles the die inside the circle of polymer channels. This header 54 is large enough to cause only a minimum pressure drop in the transporting of the heat transfer media to the discharge cross over channels 50 that are located between the polymer channels near the center of the die thickness.

The heat transfer media exit side cross over channels 50 are connected at 25 to the discharge header 22 on the outer circumference of the die just below the inlet header described above. This header 22 is sized to control the flow through the cross over channels such that the flow in each cross over channel is very nearly the same as any other cross over channel.

What is claimed is:

1. A pelletizing die, comprising:
   a pelletizing die member with a die exit side exposed to cooling fluid and a die entry side for receiving polymer fed thereto, the pelletizing die member comprising:
   a plurality of polymer channels;
   a plurality of extrusion orifices, each of said extrusion orifices being connected to a respective one of said polymer channels to form an extrusion orifice section;

heating medium conduits, each heating medium conduit connected to an undivided circumferential header including an inlet and an outlet forming a heating medium system, said heating medium conduits including at least one conduit adjacent to each polymer channel and at least one transition zone conduit between adjacent channels and adjacent to the transition zone of each of said extrusion orifices for uniformly heating polymer in each extrusion orifice, and for heating the polymer channel through a sufficiently large even pressure drop supplied by said undivided circumferential header; and a closed thermal stabilization cavity adjacent to each extrusion orifice in an associated one of said extrusion orifice sections, said thermal stabilization cavity defining a thermal stabilization zone between said die exit side exposed to cooling fluid and said heating medium conduits capable of allowing the polymer to remain in a liquid state up to solidification just as the polymer exits the extrusion orifice.

2. A pelletizing die according to claim 1, wherein said thermal stabilization cavity includes a space surrounding each extrusion orifice section at a location inwardly of said die exit side capable of providing thermal stabilization from the cooling effects of the cooling fluid.

3. A pelletizing die according to claim 1, wherein said thermal stabilization cavity includes a space extending between each extrusion orifice section at a location inwardly of said die exit side capable of providing thermal stabilization from the cooling effects of the cooling fluid.

4. A pelletizing die according to claim 1, wherein said thermal stabilization cavity includes a space extending substantially circumferentially between each extrusion orifice section at a location inwardly of said die exit side capable of providing thermal stabilization from the cooling effects of the cooling fluid.

5. A pelletizing die according to claim 1, wherein said thermal stabilization cavity includes a space extending substantially radially between each extrusion orifice within each extrusion orifice section at a location inwardly of said die exit side capable of providing thermal stabilization from the cooling effects of the cooling fluid.

6. A pelletizing die according to claim 1, wherein said thermal stabilization cavity is filled with a heat transfer media that provides good heat transfer characteristics.

7. A pelletizing die according to claim 1, wherein said thermal stabilization cavity transports heat through a convective, radiative and conductive medium.

8. A pelletizing die comprising:

a pelletizing die member with a die exit side exposed to cooling fluid and a die entry side for receiving polymer fed thereto, the pelletizing die member comprising:

a plurality of polymer channels;

a plurality of extrusion orifices connected to a respective one of said polymer channels to form an extrusion orifice section;

heating medium conduits forming a heating medium system, said heating medium conduits including at least one conduit adjacent to each polymer channel for heating the polymer channel;

a polymer channel to extrusion orifice transition zone defining means for preventing melt-fracture including a polymer channel connected to each of said extrusion orifices having a geometry based on specific polymer characteristics with related optimal pressures, and flow rates that eliminate melt fracture of the particular polymer and having said polymer characteristics with thermal transition of the polymer for optimal pellet quality; and a thermal stabilizing cavity adjacent to each of said extrusion orifices in an associated said extrusion orifice section, said thermal stabilization cavity defining a thermal stabilization zone between said die exit side exposed to cooling fluid and said heating medium conduits capable of allowing the polymer to remain in a liquid state up to solidification just as the polymer exits the extrusion orifice.

9. A pelletizing die comprising:

a pelletizing die member with a die exit side exposed to cooling fluid and a die entry side for receiving polymer fed thereto, the pelletizing die member further comprising:

a plurality of polymer channels;

a plurality of extrusion orifices connected to a respective one of said polymer channels at an extrusion orifice transition zone to form an extrusion orifice section;

a heating medium system with an undivided circumferential header including an inlet and an outlet, said undivided circumferential header capable of feeding a heating medium conduit through a sufficiently large even pressure drop adjacent to each polymer channel for uniformly heating the polymer channel including a transition zone conduit between adjacent channels and adjacent to the transition zone of each of said extrusion orifices for uniformly heating polymer in each extrusion orifice; and a thermal stabilization cavity adjacent to each extrusion orifice in an associated said extrusion orifice section, said thermal stabilization cavity defining a thermal stabilization zone between said die exit side exposed to cooling fluid and said heating medium conduits capable of allowing the polymer to remain in a liquid state up to solidification just as the polymer exits the extrusion orifice.

10. A pelletizing die according to claim 9, wherein said heating medium system includes a heating medium conduit radially outwardly of each extrusion orifice section and adjacent to each of said channels with said transition zone conduits surrounding each of said transition zones.

11. A pelletizing die according to claim 9, wherein said heating medium system includes a heating medium conduit radially inwardly of each extrusion orifice section and adjacent to each of said channels.

12. A pelletizing die according to claim 9, wherein said heating medium system includes another heating medium conduit between adjacent channels.

13. A pelletizing die according to claim 9, wherein said heating medium system includes a supply heating medium conduit radially outwardly of each extrusion orifice section and adjacent to each of said channels, said supply heating medium conduit being connected to said transition zone conduits for supplying heating medium to said transition zone conduits, additional heating medium conduits between adjacent channels and an intermediate heating medium conduit radially inwardly of each extrusion orifice section and adjacent to each of said channels, said intermediate heating medium conduit being connected to said transition zone conduits and being connected to said additional heating medium conduits for transferring heating medium between said transition zone conduits and said additional heating medium conduits for even heat distribution to the polymer based on once in and once out heating medium flow.

14. A pelletizing die according to claim 13, wherein said supply conduit is an inlet header extending circumferentially about said polymer channels capable of providing essentially equal pressure and flow to the entry of each of said transition zone channels and with a discharge header extending circumferentially about said polymer channels and connected to each of said additional channels, said discharge header having a geometry capable of providing equal flow and pressure drop across each of said additional channels.

15. A pelletizing die, comprising a pelletizing die member with a die exit side exposed to cooling fluid and a die entry side for receiving polymer fed thereto, the pelletizing die member comprising:
 a plurality of polymer channels;
 a plurality of extrusion orifices connected to a respective one of said polymer channels at a transition zone to form an extrusion orifice section;
 heating medium conduits forming a heating medium system, said heating medium conduits including at least one conduit adjacent to each polymer channel for heating the polymer channel and at least one transition zone conduit adjacent to said transition zone; and
 at least a thermal stabilization cavity defined by a continuous closed surface, said cavity being adjacent to each extrusion orifice and adjacent to said die exit side in an associated one of said extrusion orifice sections, said thermal stabilization cavity defining a thermal stabilization zone between said die exit side exposed to cooling fluid and said heating medium conduits capable of allowing the polymer to remain in a liquid state up to solidification just as the polymer exits the extrusion orifice.

16. A pelletizing die according to claim 15, wherein said thermal stabilization cavity includes at least one of a circular geometric space surrounding said plurality of extrusion orifice sections, a longitudinal geometric space alongside said plurality of orifice sections, and an interval-filling geometric space between each of said plurality of orifice sections, at a location inwardly of said die exit side capable of providing thermal stabilization from the cooling effects of the cooling fluid.

17. A pelletizing die according to claim 15, wherein said thermal stabilization cavity transmits heat through a convective, radiative and conductive medium.

\* \* \* \* \*